(12) United States Patent
Tasse et al.

(10) Patent No.: US 12,307,570 B2
(45) Date of Patent: May 20, 2025

(54) LOCAL LIVE TEXTURING OF A 3D MESH

(71) Applicant: STREEM, LLC, Portland, OR (US)

(72) Inventors: Flora Ponjou Tasse, London (GB); Pavan Kumar Kamaraju, London (GB); Ghislain Fouodji Tasse, London (GB)

(73) Assignee: STREEM, LLC, Portland, OR (US)

( * ) Notice: Subject to any disclaimer, the term of this patent is extended or adjusted under 35 U.S.C. 154(b) by 178 days.

(21) Appl. No.: 17/890,941

(22) Filed: Aug. 18, 2022

(65) Prior Publication Data

US 2023/0290036 A1 Sep. 14, 2023

Related U.S. Application Data

(60) Provisional application No. 63/318,664, filed on Mar. 10, 2022.

(51) Int. Cl.
*G06T 15/04* (2011.01)
*G06T 7/11* (2017.01)
(Continued)

(52) U.S. Cl.
CPC ............... *G06T 15/04* (2013.01); *G06T 7/11* (2017.01); *G06T 17/20* (2013.01); *G06T 19/20* (2013.01); *G06T 2219/2012* (2013.01)

(58) Field of Classification Search
CPC . G06T 15/04; G06T 15/40; G06T 7/11; G06T 17/20; G06T 19/20; G06T 2219/2012
See application file for complete search history.

(56) References Cited

U.S. PATENT DOCUMENTS 9,332,048 B2    5/2016  Johansson
10,157,446 B2 * 12/2018  Imber ................. G06V 10/60
(Continued)

FOREIGN PATENT DOCUMENTS

CA          3157926 A1 *  9/2021  ............. G06F 16/29

OTHER PUBLICATIONS

Oliveira M, Lim G-H, Madeira T, Dias P, Santos V. Robust Texture Mapping Using RGB-D Cameras. Sensors. 2021; 21(9):3248. https://doi.org/10.3390/s21093248 (Year: 2021).*
(Continued)

*Primary Examiner* — Antonio A Caschera
(74) *Attorney, Agent, or Firm* — Schwabe Williamson & Wyatt (57) ABSTRACT

Real-time local live texturing of a 3D mesh includes adding keyframes that partially overlap in a sequence of frames to a queue of keyframes. When changes to a property of the 3D mesh created from the sequence of frames meet a predetermined threshold, the face vertices are project into RGB images of the keyframes to test visibility, and the keyframes from which the face is visible is added to a visible keyframe list for each of the faces. A most recently added keyframe from the queue of keyframes is assigned to each face in the 3D mesh, and the 3D mesh is divided into mesh segments based on the assigned keyframes. The keyframe assigned to each of the mesh segments is used to compute texture coordinates for vertices in the respective mesh segment, and an image in the keyframe is assigned as a texture for the respective mesh segment. Colors from the visible keyframe list associated with each of the vertices are averaged into a single RGB value, and the RGB value is assigned to the vertex.

16 Claims, 7 Drawing Sheets

(51) Int. Cl.
*G06T 17/20* (2006.01)
*G06T 19/20* (2011.01)

(56) References Cited

U.S. PATENT DOCUMENTS

| | | |
|---|---|---|
| 10,198,860 B1 | 2/2019 | Smith |
| 11,270,507 B1 | 3/2022 | Lambert |
| 11,361,495 B1 | 6/2022 | Yan |
| 11,544,904 B1 | 1/2023 | Bhushan |
| 11,551,421 B1 | 1/2023 | Bhushan |
| 11,763,478 B1 | 9/2023 | Yang |
| 2006/0120234 A1 | 6/2006 | Aono |
| 2015/0243069 A1 | 8/2015 | Knoblauch |
| 2018/0253886 A1 | 9/2018 | Hu |
| 2019/0371058 A1 | 12/2019 | Kawaguchi |
| 2020/0107004 A1 | 4/2020 | Hayashi |
| 2020/0349754 A1 | 11/2020 | Michielin |
| 2021/0209835 A1 | 7/2021 | Fonseka |
| 2021/0279967 A1 | 9/2021 | Gernoth |
| 2022/0058871 A1 | 2/2022 | Cheng |
| 2022/0343582 A1 | 10/2022 | Dominguez |
| 2023/0290037 A1* | 9/2023 | Tasse ............... G06T 15/04 |

OTHER PUBLICATIONS

Moehrle, N., GitHub, "Algorithm to texture 3D reconstructions from multi-view stereo images", https://github.com/nmoehrle/mvs-texturing, (2014).

Cdcseacave, GitHub, "Open MVS Modules", https://github.com/cdcseacave/openMVS/wiki/Modules, (2015).

Waechter, Michael & Moehrle, Nils & Goesele, Michael. (2014). Let There Be Color! Large-Scale Texturing of 3D Reconstructions. 8693. 836-850. 10.1007/978-3-319-10602-1_54.

J. H. Lee, H. Ha, Y. Dong, X. Tong and M. H. Kim, "TextureFusion: High-Quality Texture Acquisition for Real-Time RGB-D Scanning," 2020 IEEE/CVF Conference on Computer Vision and Pattern Recognition (CVPR), 2020, pp. 1269-1277, doi: 10.1109/CVPR42600.2020.00135.

* cited by examiner

NON-TRANSITORY COMPUTER-READABLE STORAGE MEDIUM
602

PROGRAMMING INSTRUCTIONS 604,
CONFIGURED TO CAUSE A DEVICE, IN RESPONSE TO EXECUTION OF THE PROGRAMMING INSTRUCTIONS, TO PRACTICE (ASPECTS OF) EMBODIMENTS OF THE PROCESS(ES) DESCRIBED THROUGHOUT THIS DISCLOSURE.

FIG. 6

LOCAL LIVE TEXTURING OF A 3D MESH

CROSS-REFERENCE TO RELATED APPLICATIONS

This application claims the benefit of U.S. Provisional Application No. 63/318,664, filed on Mar. 10, 2022, the entire contents of which are hereby incorporated by this reference as if fully stated herein.

TECHNICAL FIELD

The present disclosure relates to the field of remote augmented reality (AR), and specifically to local live (real-time) texture mapping of a 3D mesh created from a video feed.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. Further, the captured images or video can be combined in some implementations with data from depth sensors such as LiDAR, and camera pose information obtained from motion data captured from sensors such as a MEMS gyroscope and accelerometers, which can facilitate AR software in recreating an interactive 3-D model. This 3-D model can further be used to generate and place virtual objects within a 3-D space represented by the captured images and/or video. These point clouds or surfaces may be associated and stored with their source images, video, and/or depth or motion data. In various implementations, the devices can be capable of supporting a remote video session with which users can interact via AR objects in real-time.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

A device that supports augmented reality (AR) typically provides an AR session on a device-local basis (e.g., not requiring communication with a remote system), such as allowing a user of the device to capture a video feed or stream using a camera built into the device, and superimpose AR objects upon the video as it is captured. Support for superimposing AR objects is typically provided by the device's operating system, with the operating system providing an AR application programming interface (API). Examples of such APIs include, but are not limited to, Apple's ARKit, provided by iOS, and Google's ARCore, provided by Android.

These APIs may provide depth data and/or a point cloud, which typically includes one or more points that are indicated by an x, y position within the video frame along with a depth (or z-axis). These x, y, and z values can be tied to one or more identified anchor features within the frame, e.g. a corner or edge of an object in-frame, which can be readily identified and tracked for movement between frames. Use of anchor features can allow the detected/calculated x, y, and z values to be adjusted from frame to frame relative to the anchor features as the camera of the capturing device moves in space relative to the anchor features. These calculated values allow AR objects to be placed within a scene and appear to be part of the scene, viz. the AR object moves through the camera's view similar to other physical objects within the scene as the camera moves. Further, by employing various techniques such as object detection along with motion data (which may be provided by sensors on-board the device such as accelerometers, gyroscopes, compasses, etc.), the API can maintain track of points that move out of the camera's field of view. This allows a placed AR object to disappear off-screen as the camera moves past its placed location, and reappear when the camera moves back to the scene location where the AR object was originally placed.

The device may also be used to engage in a video communications session with a remote user, such as another device or system that is likewise capable of video communications. By transmitting or otherwise sharing the depth data and/or point cloud, the remote user can be enabled to insert AR objects into the video feed, which can then be reflected back to the device providing the video feed and subsequently tracked by the device as if placed by the device user.

However, where the video feed and associated depth and motion data are simply used to recreate the view on the capturing device for the remote user, the remote user is constrained in placing AR objects only to where the device user is currently pointing the device. The remote user cannot place or otherwise associate an AR object with any objects that are not currently in-frame. A solution to such a problem is to use the video feed and associated depth and motion data to progressively create a 3D model of the environment captured in the video feed. Thus, as the user of the capturing device pans the device about, the remote user is provided with a progressively expanding 3D model or mesh, which can be refined when the user of the capturing device pans back over areas that were previously captured. As used herein, the terms 3D mesh and 3D model may be used interchangeably and refer to a collection of vertices, edges, and faces that describe the shape of a 3D object or scene.

During a live AR session, a 3D mesh of the scene is often reconstructed, either by the underlying platform (ARKit on Lidar-enabled devices) or a custom algorithm. In both cases, a mesh of the scene is continuously updated as more of the physical environment is captured by the AR device. This 3D mesh is typically not textured, and does not fully capture the details of the scene.

Current methods for scanning 3D environments typically output a 3D mesh that either has no color information, or has color data per vertex. These meshes do not have texture information, and thus high-resolution details of the scene are not captured during the reconstruction. Conventional texture mapping of the 3D mesh is typically done in a post-processing step (such as MVS Texturing), on a server, after the scanning by the AR device is complete. The current state of the art adds texture information after the mesh has been captured and all the images of the scene are available during an offline process. This is because texture mapping is often a very expensive operation: it requires determining for each vertex on the mesh the correct video frame to select as texture and use to compute texture coordinates. Conventional off-line texture mapping works as follows: 1—For each face of the mesh, these methods typically project the face onto each tracked image to determine the best image to use for that mesh. 2—Once the right camera/image for each face is selected, the images are slightly modified to reduce any lighting differences across images of faces that share a border. This reduces boundary artifacts in the final texture, since various images may have been taken at different times, with diverse exposures and lighting conditions. 3—Each vertex is then projected into the image plane using the associated camera/image for the face it belongs to, to obtain a texture coordinate for each vertex. 4—The images (after color adjustment) are then combined into a single large texture, and texture coordinates adjusted to project into the larger texture.

Moreover in a live scanning scenario, the mesh is constantly updated as more of the scene is captured by the camera. This means that this texture mapping operation has to be repeated every time the mesh is changed. Other conventional methods, such as TextureFusion, propose real-time texture mapping of a 3D mesh by creating a live, constantly updated, textured mesh, but this is done by taking in camera-tracked RGB-D frames to generate a mesh along with vertices, faces, and texture. This process requires significant amount of computer resources which make the methods unsuitable for deployment on mobile devices.

Disclosed embodiments include systems and methods that allow for local live or real-time color texture mapping on a live 3D mesh comprising only vertices and faces with no color data or texture information. The real-time texture mapping can run locally on the AR device, such as a mobile device, rather than requiring a remote server. The end result is a high-fidelity textured mesh that accurately represents the scene the mesh captured. This color information in the texture may originate from camera-tracked images of the live AR session capturing the scene. Unlike TextureFusion, the disclosed embodiments do not require depth images to be used as input. The disclosed embodiments work directly with a 3D mesh generated on a device with or without depth sensors.

Figure 1:
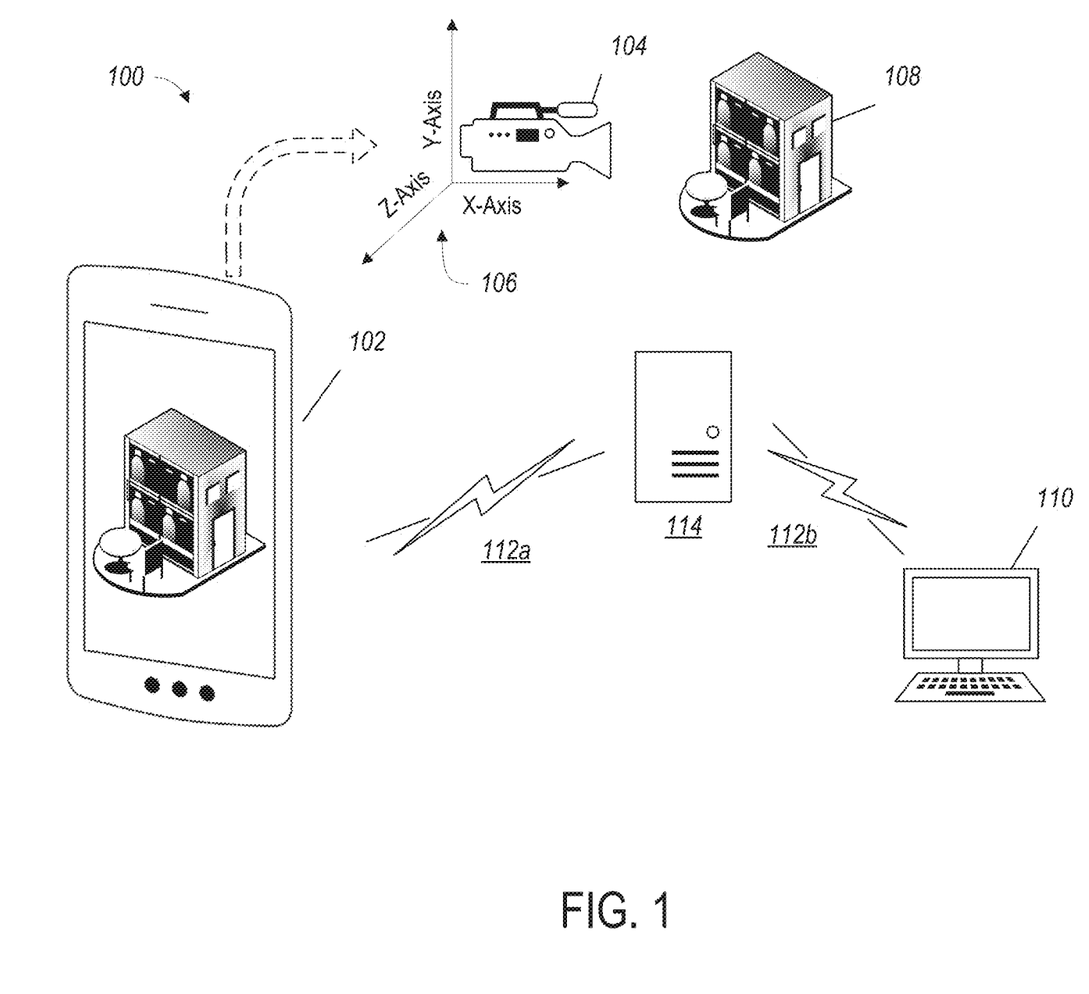
FIG. 1 illustrates an example system that may allow capture of a video feed and camera pose information, and transmission of the same to a remote device, for interaction and placement of AR objects.

FIG. 1 illustrates an example system 100 that may allow capture of a video feed and camera pose information, and transmission of the same to a remote device, for interaction and placement of AR objects. System 100 may include a device 102, which may be in communication with a remote device 110. In the depicted embodiment of FIG. 1, device 102 is a smartphone, which may be implemented as a computer device 500, to be discussed in greater detail in FIG. 5. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein. Device 102 further may include a camera 104 and may include one or more spatial position sensors 106 (depicted by a series of axes), to provide information about the spatial position of camera 104. In embodiments such as where device 102 is a smartphone, tablet, or laptop, camera 104 and spatial position sensors 106 may be contained within the body of device 102. In other embodiments, one or more of camera 104 and/or spatial position sensors 106 may be external to device 102, forming a system. For example, camera 104 and spatial position sensors 106 may be housed in an external camera unit that is connected to device 102, which may be a laptop, desktop, or similar type of computer device 500.

Camera 104 is used to capture the surrounding environment of device 102, and by extension, the user. The environment may include one or more three-dimensional objects 108. Camera 104 may be any camera that can provide a suitable video stream for the intended purpose of device 102. Where device 102 is implemented as a smartphone or tablet, camera 104 may be a built-in camera. In other embodiments, such as where device 102 is a laptop, camera 104 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and device 102. The video stream may further include audio captured by one or more microphones (not pictured) in communication with the device. The video stream and any associated audio may comprise a video feed that is suitable for transmission, as will be discussed in greater detail herein.

Spatial position sensor(s) 106 may be configured to provide positional information about camera 104 that at least partially comprises camera pose information, such as camera 104's pan and tilt. Other measured positional vectors may include camera movements, such as the camera rising or falling, or moving laterally. Spatial position sensors 106 may be implemented with one or more micro and/or MEMS sensors, such as gyroscopes to measure angular movements, accelerometers to measure linear movements such as rises, falls, and lateral movements, and/or other suitable sensors such as a magnetic flux sensor to provide compass heading. In other embodiments, spatial position sensors 106 may be implemented using any suitable technology capable of measuring spatial movements of camera, including but not limited to depth sensors (not depicted).

In some embodiments, either the camera 104 or the spatial position sensor(s) 106 may be capable of making direct depth measurements. For example, either may include depth-sensing and/or range finding technology, such as LiDAR, stereoscopic camera, IR sensors, ultrasonic sensors, or any other suitable technology. In other embodiments, device 102 may be equipped with such depth-sensing or range finding sensors separately or additionally from camera 104 and spatial position sensor(s) 106.

Device 102 may be in communication with one or more remote devices 110, such as via a communications link 112. Remote device 110 may be any suitable computing device, such as computer device 500, which can be configured to receive and present a video feed from device 102 to a user of remote device 110. Remote device 110 may be the same type of device as device 102, or a different type of device that can communicate with device 102. Remote device 110 further may be capable of allowing a user to insert, remove, and/or manipulate one or more AR objects into the video feed, and further may allow the user to communicate with a user of device 102.

Communications links 112a and 112b between device 102, server 114, and remote device 110 may be implemented using any suitable communications technology or technologies, such as one or more wireless protocols like WiFi, Cellular (e.g., 3G, 4G/LTE, 5G, or another suitable technology), Bluetooth, NFC, one or more hardwired protocols like Ethernet, MoCA, Powerline communications, or any suitable combination of wireless and wired protocols. Communications links 112a and 112b may at least partially comprise the Internet. Communications links 112a and 112b may pass through one or more central or intermediate systems, which may include one or more servers, data centers, or cloud service providers, such as server 114. One or more of the central or intermediate systems, such as server 114, may handle at least part of the processing of data from the video feed and/or LiDAR from device 102, such as generating a 3D mesh and/or 3D model, digital twin, and/or may provide other relevant functionality. In embodiments, server 114 may execute some or all of methods 200, 300 and/or 400, described further below. In other embodiments, methods 200, 300 and/or 400 may be executed in part by any or all of device 102, server 114, and/or remote device 110.

Figure 2:
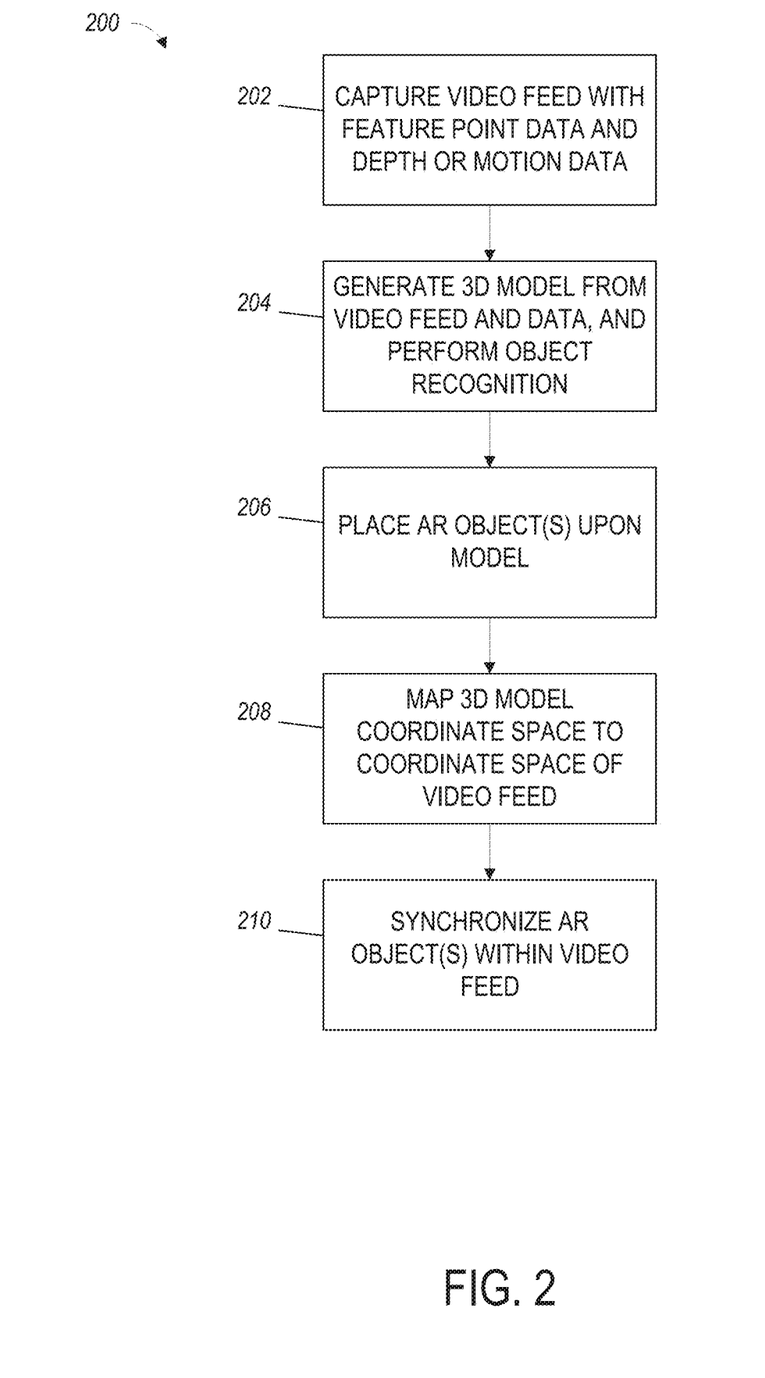
FIG. 2 depicts an example method for generation of a 3D model and placement, where the AR object is reflected into a video stream from an end user device, such as device.

FIG. 2 depicts an example method 200 for generation of a 3D model and placement, where the AR object is reflected into a video stream from an end user device, such as device 102. Various embodiments may implement some or all of the operations of method 200, and the operations of method 200 may be performed in whole or in part, and may be performed out of order in some embodiments. Some embodiments may add additional operations. In some embodiments, method 200 may be executed by device 102 and the result transmitted to remote device 110. In another embodiment, the video feed from device 102 may be transmitted to remote device 110 and remote device 110 may perform method 200.

In operation 202, a video feed may be captured, with or without an associated depth and/or motion data as described above with respect to FIG. 1. The captured video may come from a variety of sources. In some examples, a camera 104 is used to capture the video, and one or more spatial position sensors 106 may be used to capture motion data, including camera pose information. In other examples, a different device or devices may be used to capture the video feed, depth data and/or motion data. The video feed and any associated depth/motion data may be captured at a previous time, and stored into an appropriate file format that captures the video along with the depth/motion data. In some embodiments, the motion data may include depth and/or point cloud information, which itself may have been computed from the motion data and video feed, such as will be discussed below with respect to methods 300 and 400. In other embodiments, and as mentioned above with respect to FIG. 1, either camera 104 or spatial position sensors 106, or a dedicated depth sensor, may directly capture depth data. The result from operation 202, in some embodiments, is a video feed with associated point cloud data, or raw motion data from which the point cloud data is computed.

Figure 3:
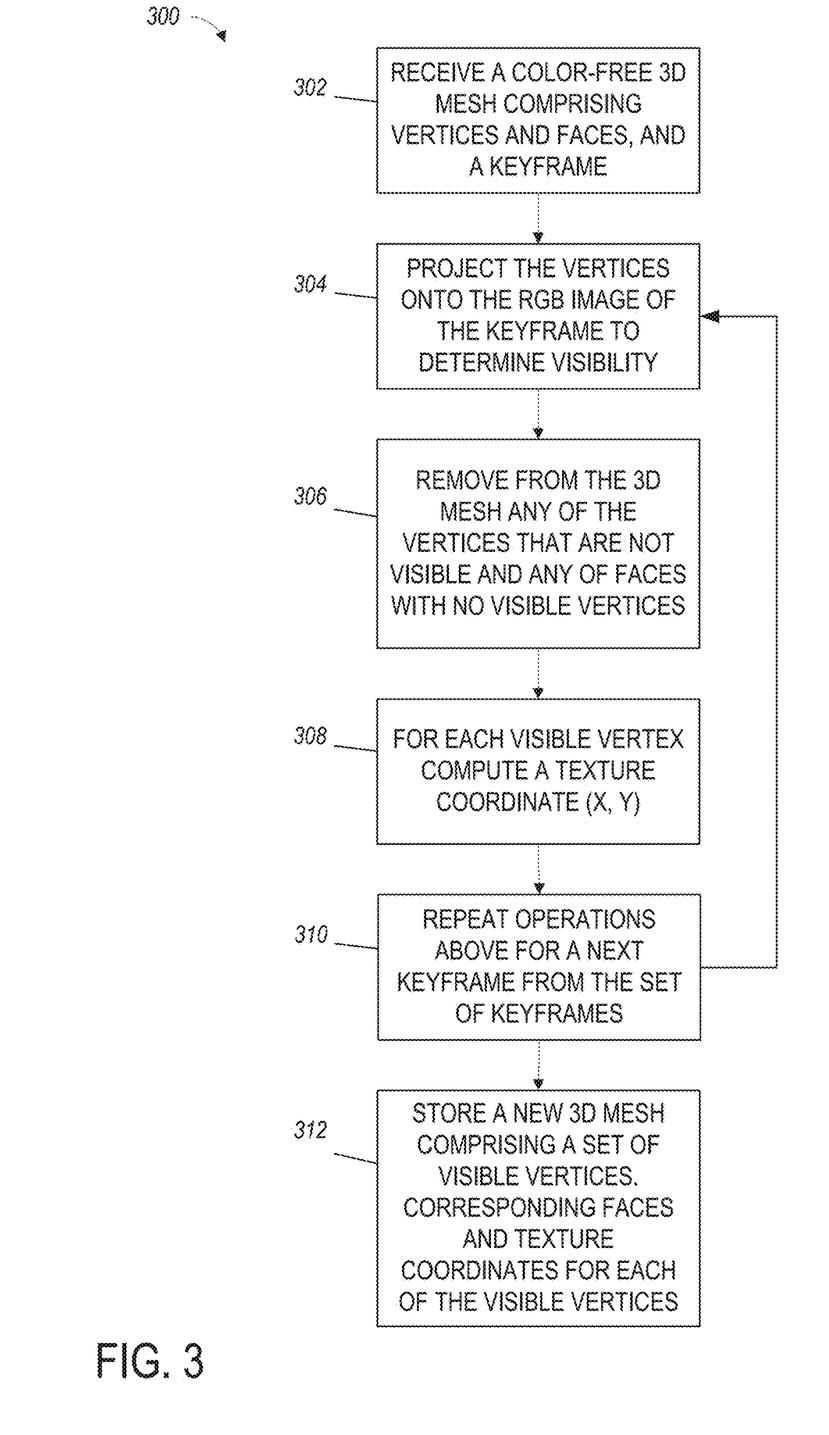
FIG. 3 illustrates an example process for local live texture mapping of a 3D model according to some embodiments.

In operation 204, the video feed, motion data, and optionally depth data, are used to construct a 3D model/digital twin with which a remote user can interact. The 3D model/digital twin may be constructed by first generating a 3D mesh from camera pose information and point cloud or other depth information. Image information from the video feed may then be integrated with the 3D mesh to form the 3D model/digital twin, such via a texture mapping process. In some embodiments, techniques known in the art may be used to generate the 3D mesh and/or the 3D model/digital twin. Method 300, described below with respect to FIG. 3, is one possible process that can be implemented to perform a local real-time texture mapping process on the 3D mesh using images from the video feed.

Furthermore, in embodiments, object recognition may be performed on the 3D model/digital twin to detect various features, such as appliances, furniture, topographical features such as surfaces and/or shapes, or other various relevant features. In some embodiments, object recognition may be performed on the initial video stream prior to model generation, with the recognized features identified in the resulting 3D model/digital twin. In other embodiments, object recognition may be performed directly on the 3D model/digital twin. Generation of the 3D model/digital twin may by an iterative or continuous process, rather than a single static generation, with the model being expanded as the device providing the live video feed moves about its environment and captures new aspects. The 3D model/digital twin may also be updated in real time to accommodate environmental changes, such as objects being moved, new objects/features being exposed due to persons moving about, in, or out of the video frame, etc.

Following generation of the 3D model/digital twin, in embodiments, it is made available to users' remote devices in real-time, such as a user of remote device 110. In operation 206, a user may place, tag, or otherwise associate one or more AR objects within the 3D model/digital twin. The AR objects may be tagged or associated with one or more objects within the 3D model/digital twin, such as objects recognized via object recognition performed as part of operation 204. The position of such AR objects may be expressed with respect to the coordinates of some part of the tagged or associated object. The coordinates of the AR objects within the 3D model/digital twin coordinate system may be determined by resolving the reference to the tagged or associated object. Other AR objects may be tagged to a specified location within the 3D model/digital twin, with the location of such AR objects expressed in terms of the 3D model/digital twin's coordinate system rather than relative to the coordinates of an object.

The choice of how to express the location of a given AR object within the 3D model/digital twin may depend upon the nature of the AR object. For example, where an AR object is intended to relate to a recognized object, e.g., pointing out a feature of some recognized object, it may be preferable to locate the AR object relative to the recognized object, or some anchor point or feature on the recognized object. In so doing, it may be possible to persist the placement of the AR object relative to the recognized object even if the recognized object is subsequently moved in the video feed, and the corresponding 3D model/digital twin is updated to reflect the new position of the moved object. Likewise, it may be preferable to tie an AR object to an absolute location within the 3D model/digital twin when the AR object is intended to represent a particular spatial position within the environment of the video feed, e.g. the AR object is a piece of furniture or otherwise indicates a location in the area surrounding the device providing the video feed, such that tagging to a recognized object is unnecessary or undesirable.

As will be understood, the AR objects may be two-dimensional or three-dimensional objects, such as may be provided by an image library or 3D object library. Placement of the AR objects can include determining AR object orientation within the model, e.g., its location within a 3D coordinate space as well as rotational orientation relative to three axes, pitch, yaw, and roll, so that the AR object is expressed in at least six degrees of freedom.

In operation 208, the coordinate space of the 3D model/digital twin is mapped to the coordinate space of the video feed. The 3D model/digital twin may be represented in a 3D coordinate space with reference to an origin point, which may be arbitrarily selected. In some embodiments, the origin may be relocated or shift as the 3D model/digital twin evolves, such as where the 3D model/digital twin is continuously generated and expanded as the video feed progresses. The point of view of the camera may change, such as due to the user of the device providing the video feed moving the device about. While depicted as a single step, it should be understood that in some embodiments, the coordinate space between the 3D model/digital twin and video feed may be continuously reconciled.

One possible way in some embodiments of mapping the coordinate space of the 3D model/digital twin with the video feed includes correlation of anchor points. As mentioned above, one or more anchor points may be identified from the video feed. These anchor points serve as locations within the environment around the capturing device that can be repeatedly and consistently identified when the point moves out of and back into frame. These anchor points can be identified, tagged, or otherwise associated with corresponding objects within the 3D model/digital twin, such as by specifically identifying the anchor points in point cloud data, which is then used in the process of 3D model/digital twin generation. The identified points in the 3D model/digital twin that correspond to the anchor points in the video feed thus provide fixed reference points common between the coordinate spaces of the 3D model/digital twin and video feed. By comparing the expression of the location of a given anchor point within the 3D model/digital twin to its corresponding location expression within the video feed, the various mathematical factors needed to translate between the two coordinate systems can be determined. With this information, the position of the object placed within the 3D model/digital twin can be translated to positional information for placement within the video feed coordinate space.

The mathematical factors may include scale amounts, for example to correlate the relative sizes and distances of objects within the video feed with objects generated in the 3D model/digital twin, as well as placed AR objects. These scale amounts can also be useful for making measurements within the 3D model/digital twin, e.g. distances, sizes, volumes, etc., and having these measurements accurately reflect the environment surrounding the device providing the video feed.

In operation 210, the AR object(s) remotely placed in operation 206 are synchronized back to the video feed, using the mapping between the 3D model/digital twin coordinate space and video feed coordinate space established in operation 208. As a result, a user interacting with the 3D model/digital twin can place one or more AR objects within the model at location(s) that are currently out of frame from the video feed, and have the one or more AR objects appear in the video feed at their correct placed locations once the device providing the video feed moves to place the locations of the AR objects into frame. The appearance of the AR objects may also be generated with respect to the AR object's orientation, e.g. pitch, roll, and yaw, as discussed above with respect to operation 206. Thus, in operation 210 the AR objects are rendered for the video feed with respect to the point of view of the device providing the video feed, rather than the point of view of the user of the 3D model/digital twin who is placing the AR objects.

Depending upon the capabilities of an implementing system or device, method 200 may be performed progressively while the video is being captured, or may be performed on a complete captured video and associated AR data. As suggested above, in some embodiments the 3D model/digital twin may be computed on the fly, in real time, from the video feed, and/or depth or motion data as described above in operation 202, from a user device. As it is being generated, the model/digital twin may be updated in real-time if the environment captured in the video feed changes, such as by moving of one or more objects.

It should be appreciated by a person skilled in the art that some or all of method 200 may be performed by one or more components of system 100. For example, device 102 may provide the video feed and at least part of the depth data, motion data and/or point cloud data. The user of the remote device 110 may interact with the 3D model/digital twin, including placement of one or more 3D objects that are reflected back into the video feed or scene. In some embodiments, one of the remote device 110, server 114, and/or device 102 may be responsible for generation of the 3D model/digital twin, and/or another remote system, such as a central server, cloud server, or another computing device that may be part of the communications link 112.

Furthermore, some of the operations of method 200 may be performed in real-time during video feed capture. As the video feed is stored, the video feed may be processed and the 3D model/digital twin generated on the fly from the video feed with real-time texture mapping. Optionally, AR objects may be subsequently placed and then made visible in subsequent playback of the video feed. In other embodiments, some of the operations of method 200 may be performed off-line, post-capture of the video feed. For example, the video feed may be stored, either on device 102, sever 114, remote device 110, or another remote system. The 3D model/digital twin may be subsequently generated following video feed capture, and/or AR objects placed within the 3D model/digital twin following video feed completion and capture. The video feed in turn may be associated with a stored version of the 3D model/digital twin. In still other embodiments, the 3D model/digital twin may additionally or alternatively be tagged or associated with a geolocation corresponding to the capture of the video feed, such that a subsequent device capturing a new video feed in the associated geolocation can incorporate one or more of the AR objects placed within the associated 3D model/digital twin.

Further, it should be understood that, while the foregoing embodiments are described with respect to a device 102 that may provide a video feed, system 100 and/or method 200 may be adapted to work with other technologies, e.g. waveguides and/or other see-through technologies such as smart glasses or heads-up displays, which may project AR objects onto a view of the real world, rather than a video screen or electronic viewfinder. In such embodiments, for example, sensors including video, depth, and/or motion sensors, may be used to construct the 3D model or digital twin, with which the remote user may interact and place AR objects. The remote user may or may not see a video feed that corresponds to the user's view through device 102; in some embodiments, the remote user may simply see the 3D model/digital twin, which may be updated/expanded in real time as the user of device 102 moves above. AR objects placed in the 3D model/digital twin, rather than being overlaid on a video feed, would be projected onto the user's view of the real world through device 102 in synchronization with the 3D model/digital twin.

Finally, one or more operations of method 200, such as operation 210, may be performed in reverse. For example, a user may place an object into the video feed, and have it reflect back into the corresponding 3D model or digital twin. Once the coordinate space of the 3D model/digital twin and video feed are mapped in operation 208, objects may be placed either in the model/twin or in the video feed, and be synchronized together.

Referring now to FIG. 3, an example process 300 performed by a texture mapping component for local live texture mapping of a 3D model according to some embodiments is described. As used herein, local live texture mapping of a 3D model refers to performing texture mapping contemporaneously as the 3D model/digital twin is continuously generated and expanded as the video feed progresses. Various embodiments may implement some or all of the operations of method 300, and the operations of method 300 may be performed in whole or in part by locally in computing device 102 or remote device 110, and may be performed out of order in some embodiments. Some embodiments may add additional operations. In some embodiments, method 300 does not need to be executed in whole or in part by server 114.

In operation 302, the process receives a color-free 3D mesh comprising vertices and faces, and a keyframe from a set of keyframes, the keyframe comprising an RGB image and camera pose information. In operation 304, each the vertices of the 3D mesh is projected into the RGB image of the keyframe to determine if each of the vertices is visible in the RGB image. In operation 306, any of the vertices that are not visible and any of the faces with no visible vertices are removed from the 3D mesh. In an embodiment, the vertices of the 3D mesh can be projected into the RGB image of the keyframe using the equations $TC_t = E_k * \text{inverse}(T_k) * v_t$ described further below.

In operation 308, for each of the vertices determined to be visible in the 3D mesh, a texture coordinate (x, y) is computed by projecting the vertex from a world coordinate system to a 2D image plane of the RGB image in which the vertex is visible. For further detail, refer to operation 412 below. Additionally or alternatively, the RGB pixel color at texture coordinate (x,y) in the 2D image can be assigned to the vertex directly. Doing this operation for every vertex produces a colored mesh which can be an alternative to the textured mesh.

In operation 310, to cover the full mesh with texture, the projecting, removing, and computing steps above are repeated for a next keyframe from the set of keyframes until there until all the keyframes are processed. In operation 312, the process stores a new 3D mesh comprising a set of visible vertices and corresponding faces and texture coordinates for each of the visible vertices.

Note that if the input color-free 3D mesh is divided into pieces as is the case with the iOS ARKit mesh reconstruction, then each piece can be processed independently from the others. This can be leveraged by having a thread processing each piece, so that multiple pieces can be processed at the same time.

Figure 4A:
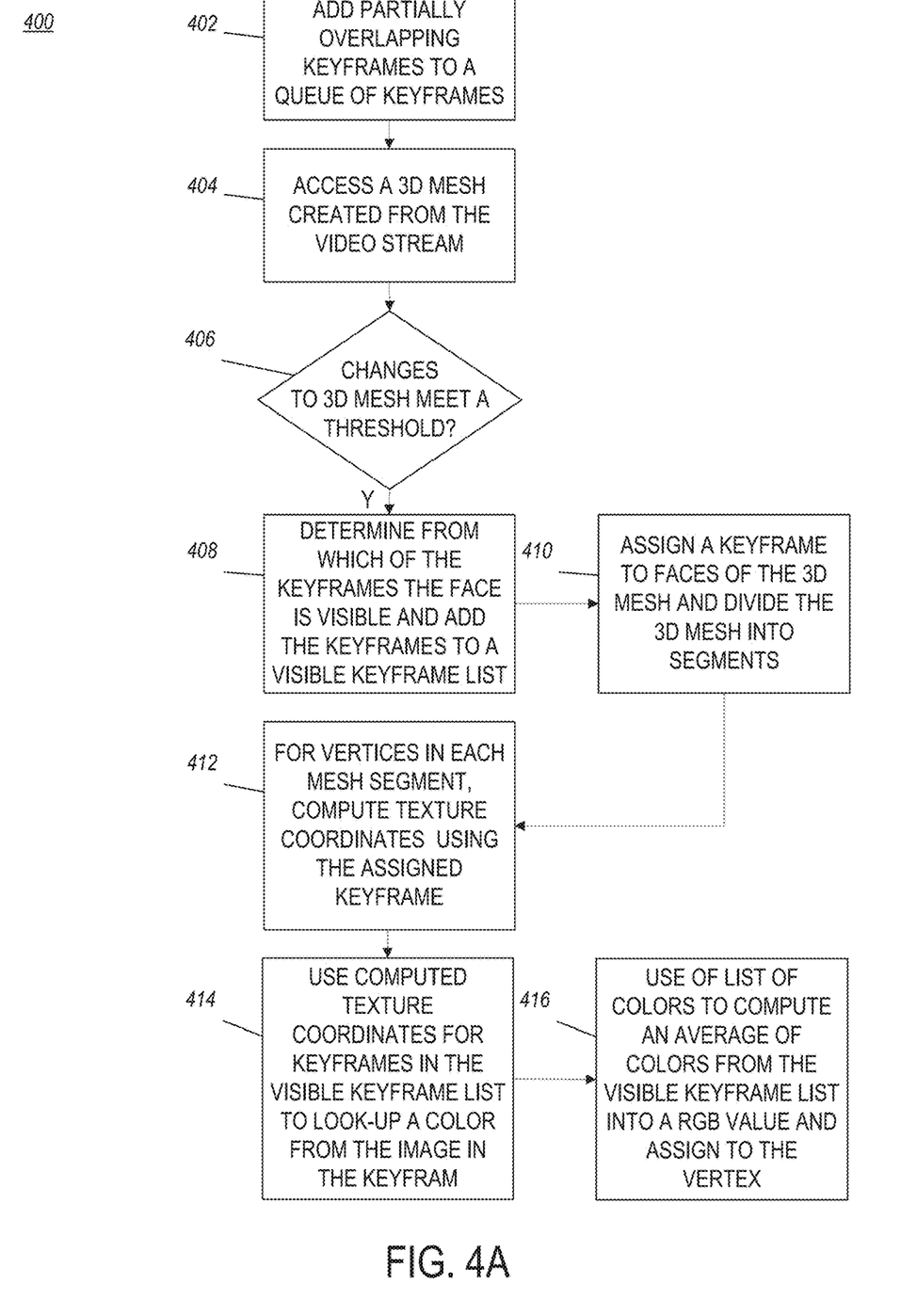
FIG. 4A illustrates another embodiment for a process for local live texture mapping of a 3D model.

FIG. 4A illustrates another embodiment for a process 400 for local live texture mapping of a 3D model performed by a texture mapping component. In operation 402, a video stream or other sequence of frames of a scene or environment captured by a capturing device (e.g., device 102) is received, and keyframes that partially overlap in the sequence of frames are detected and added to a queue of keyframes. At time t, the 3D mesh may be represented using a data structure $M_t$, and a queue K={ } may be used to store the set of overlapping keyframes from the incoming video stream. $M_t$ comprises a set of vertices $V_t$ and a set of faces/triangles $F_t$. K is initially empty at the beginning of the video session, and is updated with automatically detected keyframes as the session continues.

Figure 4B:
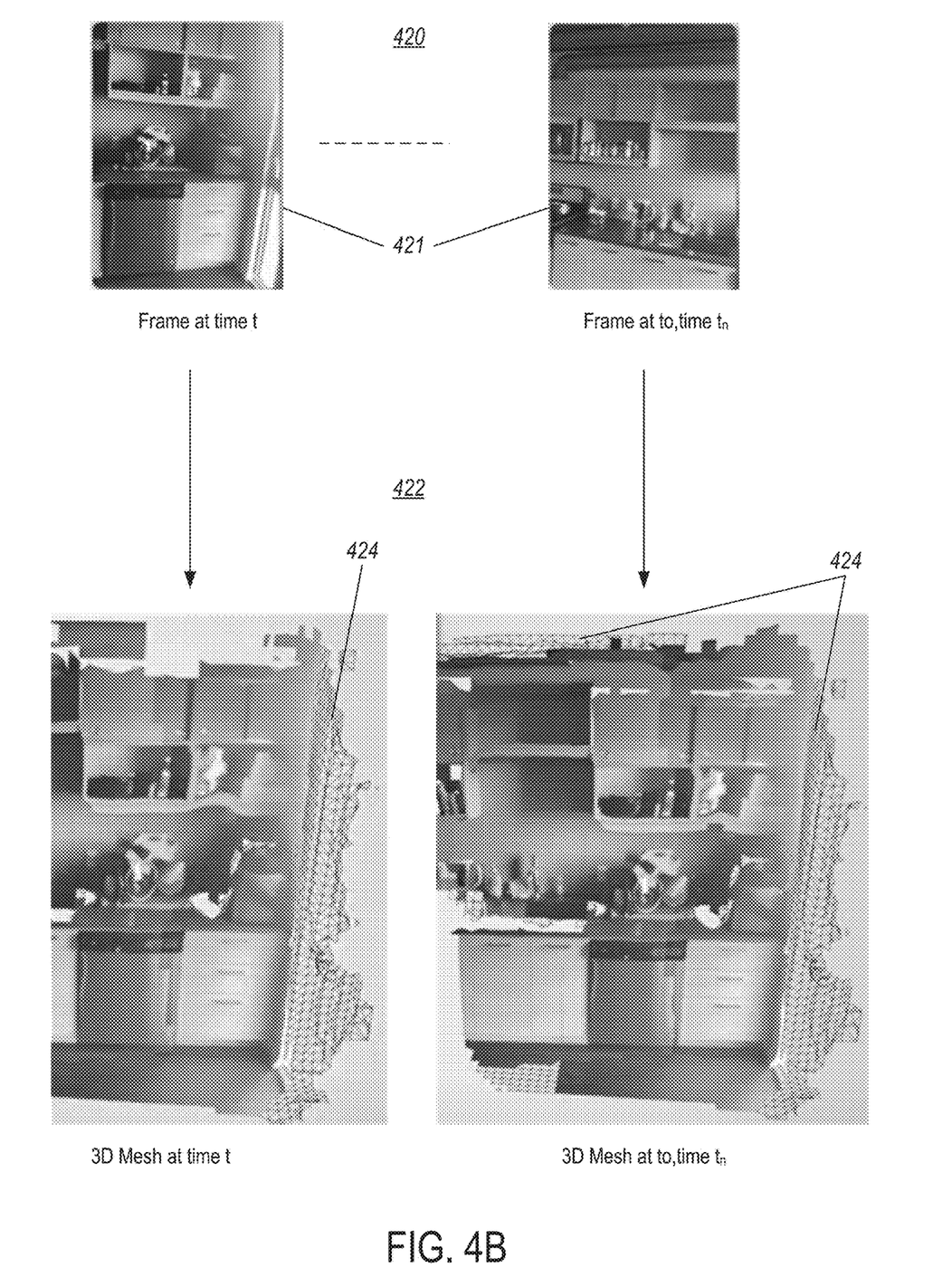
FIG. 4B illustrates an example video stream and example 3D mesh created over time.

FIG. 4B illustrates an example video stream 420 and 3D mesh created overtime therefrom. In the example video stream 420, the camera is panning from right to left during image capture. The video stream 420 comprises a sequence or timeline of many images or frame 421. In some embodiments, a keyframe is frame 421 in the timeline that defines starting and ending points of a transition or indicates a beginning or end of a change made to a parameter of the video. Stated differently, a sequence of keyframes may define what movement a viewer will see, and the position of the keyframes on the video defines the timing of the movement.

In some embodiments, at any time t, keyframes are added to the queue of keyframes if a pair of neighboring keyframes partially overlap from 5-40% to cover as much of the physical scene depicted as possible. In one embodiment, an overlap between a given pair of neighboring keyframes can be identified by determining whether each of the keyframes shares at least a predetermined number of points in the sparse depth map. In one example embodiment, at any given time t, the queue may be configured store 50-400 keyframes and may be implemented as a first-in-last-out (FIFO) queue. In some embodiments, a plurality of keyframes is automatically extracted from the sequence of frames as described in U.S. Patent Application No. 63/318,684 (P032Z). Alternatively or additionally, other method of determining keyframes can be used.

In some embodiments and depending upon the capabilities of the capturing device, camera pose information may also be captured and received with the frames 421. The camera pose information may include rotational information such as camera pan, tilt, and yaw, translational information such as breadth, width, and depth movements, as well as camera intrinsic information such as focal length, image sensor format (e.g. sensor resolution, possibly expressed in x by y dimensions), focus point/distance, depth of field, aperture size (related to depth of field), lens distortion parameters (if known), etc. Depending upon the implementation, not all of this information may be available.

Referring again to FIG. 4A, in operation 404, the process accesses a 3D mesh that was created from the sequence of frames. In some embodiments, the 3D mesh may be created from another process and accessed from memory by the current process. For example, a 3D mesh of triangles may have been generated from depth maps (or a densified point cloud), using a suitable algorithm such as Volumetric TSDF (Truncated Signed Distance Function) Fusion, Poisson Reconstruction or Delaunay Reconstruction.

In operation 406, it is determined when changes to a property of the 3D mesh meet a predetermined threshold. Example properties of the 3D mesh may include one or more of a number of faces, triangles, vertices, or an area of the 3D mesh. For example, it may be determined that a 3D mesh is changed or updated beyond a threshold based on a number of new triangles or faces created. This may be done by receiving an update notification at time t, and in response, determining the difference between the number of vertices in 3D mesh $M_t$ and $M_{(t-1)}$ to determine if the threshold is met.

The bottom portion of FIG. 4B also shows an example 3D mesh 422 created from the frames of the video stream 420 over time. As shown, the 3D mesh 422 comprises a number of faces or triangles defined by vertices. As the camera pans, the 3D mesh 422 is also expanded, creating more faces or triangles 424 over time (e.g., time t to time $t_n$). Operation 406 in FIG. 3A tracks the number of changes or updates to one or more of the mesh properties over a predetermined time or since a previous update. The actual thresholds to compare the changes made to the 3D mesh properties may depend on the type of video streaming, and the size of the mesh. This check of the 3D mesh properties is make sure the 3D mess changes sufficiently to warrant and update to the texture process, which can be time consuming or process intensive. It should be noted that FIG. 3B shows most of the faces of the 3D mesh 422 with texturing for illustration, but the texturing process occurs later in operation 410.

Referring again to FIG. 4A, in operation 408, each of the faces in the 3D mesh are analyzed to determine from which of the keyframes the face is visible by projecting the face vertices into the RGB image of the keyframes to test visibility, and the keyframes from which the face is visible are added to a visible keyframe list maintained for each of the faces. The keyframes from which the face is visible is most suitable to be used for texture mapping. The visible keyframe list is used to determine all the faces that are visible in the same keyframe.

In one embodiment, determining from which of the keyframes the face is visible and segmentation may comprise computing, for each face/triangle $F_t$ of the 3D mesh, a centroid $C_t$ from vertices defining the face. The keyframes in the visible keyframe list are tested (from the most recent to the oldest) to determine if the centroid $C_t$ of $F_t$ is visible within the keyframe. In one embodiment, a face is visible if a dot product of a face normal and the camera direction (determined by the camera data) is less than 0 (i.e., the angles are less than 90 degrees). The search can be stopped as soon as a keyframe k is found where $C_t$ is visible, and the found keyframe k is assigned to that face.

In operation 410, each of the faces in the 3D mesh are assigned a most recently added keyframe from the visible keyframe list for the face, and the 3D mesh is divided into mesh segments based on the assigned keyframe. For example, if 100 triangle/faces are seen in a single keyframe, then those faces are added to a mesh segment for that keyframe. Any non-visible faces may be removed from the 3D mesh along with the vertices.

For multiprocessing, each of the mesh segments may be optionally assigned to a respective process (or thread) for averaging the coloring in operation 412 below and/or for texturing.

In operation 412, for each of the mesh segments, the process uses the keyframe assigned to the respective mesh segment to compute texture coordinates (x, y) for vertices in the mesh segment, and assign an image in the keyframe as a texture for the respective mesh segment.

In more detail the process of computing texture coordinates for each vertex projects the vertex from the world coordinate system to the 2D image plane as follows. Let $T_k$ be the camera to world transform and $E_k$ be the camera intrinsics of the keyframe k assigned to the mesh segment. A texture coordinate for a vertex $v_t$ is computed by projecting $V_t$ to the image space using:

$$TC_t = E_k * \text{inverse}(T_k) * v_t,$$

where $\text{inverse}(T_k)*v_t$ translates from world coordinates to camera coordinates, and $E_k$ translates camera coordinates to image space to calculate where in the image the texture is located. $TC_t$ is added to a list or table of stored texture coordinates.

In operation 414, for each of the vertices in the 3D mesh, the visible keyframe list for the face to which the vertex belongs is accessed and the computed texture coordinates (x, y) for each of the keyframes in the visible keyframe list are used to look-up a color from the image in the respective keyframe. Operation 414 results in a list of colors, one for each keyframe from which the vertex is visible.

In operation 416, for each of the vertices in the 3D mesh, colors from the visible keyframe list associated with each of the vertices is averaged into a single RGB value, and the RGB value is assigned to the vertex. Optionally, the process attaches the image from assigned keyframe to each mesh segment as texture data. This is sufficient for any 3D rendering pipeline executing on the computing device to display the textured mesh segment.

The 3D mesh is then textured by reprojecting the various images from the video or sequence from the keyframes onto the 3D mesh. In one embodiment, method 400 is performed in real-time on an on-going video stream. Thus, where performed in real-time, operations 402-410 may be performed in a loop and/or simultaneously, as the 3D model is progressively constructed, densified, and textured, with the model being refined as the capturing device pans back over previously captured areas of the environment, enabling refining of details. In other embodiments, the method can be performed in a single pass on a recorded video or may be performed iteratively.

Figure 5:
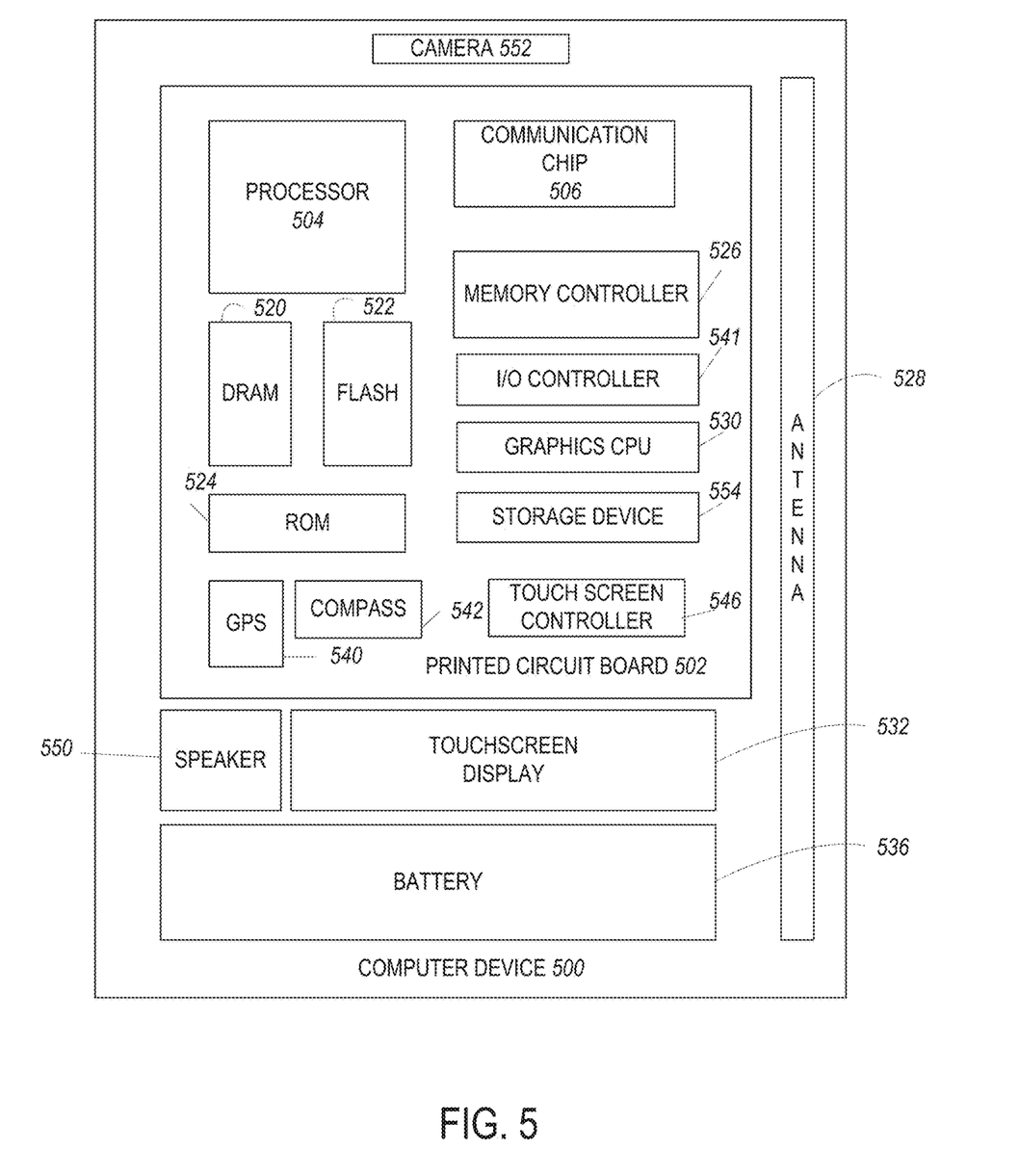
FIG. 5 is a block diagram of an example computer that can be used to implement some or all of the components of the system of FIG. 1, according to various embodiments.

FIG. 5 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100 and/or method 200, described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

Figure 6:
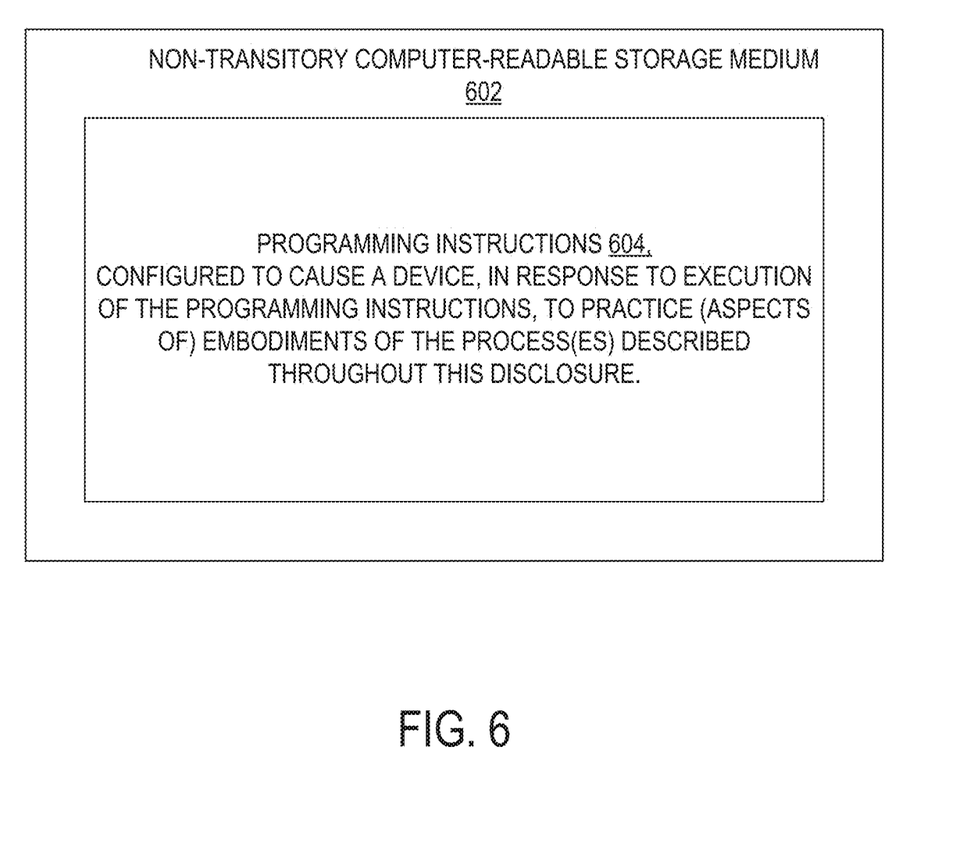
FIG. 6 is a block diagram of a computer-readable storage medium that can be used to implement some of the components of the system or methods disclosed herein, according to various embodiments.

FIG. 6 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer device 500, in response to execution of the programming instructions, to implement (aspects of) system 100 or method 200. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

The invention claimed is:

1. A method comprising:
receiving, at a computing device, a sequence of frames of a scene captured by a capturing device, and adding keyframes that partially overlap in the sequence of frames to a queue of keyframes;
accessing, by the computing device, a 3D mesh created from the sequence of frames;
determining, by the computing device, when changes to a property of the 3D mesh meet a predetermined threshold;
determining, by the computing device, for each face in the 3D mesh, from which of the keyframes in the queue of keyframes the face is visible by projecting the face vertices into RGB images of the keyframes to test visibility, and adding the keyframes from which the face is visible to a visible keyframe list for each of the faces;
assigning to each of the faces in the 3D mesh, by the computing device, a most recently added keyframe from the visible keyframe list, and dividing the 3D mesh into mesh segments based on the assigned keyframes;
using, by the computing device, the keyframe assigned to each of the mesh segments to compute texture coordinates (x, y) for vertices in the respective mesh segment, and assigning an image in the keyframe as a texture for the respective mesh segment; and
averaging, by the computing device, for each of the vertices in the 3D mesh, colors from the visible keyframe list associated with each of the vertices into a single RGB value, and assigning the RGB value to the vertex.

2. The method of claim 1, wherein adding keyframes that partially overlap in the sequence of frames to a queue of keyframes further comprises: determining, by the computing device, whether each of a pair of neighboring keyframes shares at least a predetermined number of points in a sparse depth map.

3. The method of claim 1, wherein determining when changes to a property of the 3D mesh meet a predetermined threshold further comprises: including as the property of the 3D mesh one or more of a number of faces, triangles, vertices, or an area of the 3D mesh.

4. The method of claim 3, further comprising:
representing the 3D mesh at time t using data structure $M_t$, $M_t$ comprising a set of vertices and a set of faces or triangles $F_t$;
responsive to receiving an update notification, determining a difference between a number of vertices in $M_t$ and $M_{(t-1)}$; and
if the difference is less than the predetermined threshold, ignoring the change to the 3D mesh until a next update notification.

5. The method of claim 1, wherein assigning to each face in the 3D mesh one of the keyframes from the queue of keyframes, and dividing the 3D mesh into mesh segments based on the assigned keyframes further comprises: assigning each of the mesh segments to a respective process or thread for averaging the coloring or for texturing.

6. The method of claim 1, wherein assigning to each face in the 3D mesh one of the keyframes from the queue of keyframes, and dividing the 3D mesh into mesh segments based on the assigned keyframes further comprises:
representing the 3D mesh at time t using data structure $M_t$, $M_t$ comprising a set of vertices and a set of faces $F_t$;
for each of the faces $F_t$, searching and testing the keyframes in the queue of keyframes from most recent to oldest to determine if a centroid $C_t$ of $F_t$ is visible within the respective keyframe; and
stopping the search when a keyframe k is found where $C_t$ is visible, and assigning the keyframe k to the face $F_t$.

7. The method of claim 6, wherein determining if the centroid $C_t$ of $F_t$ is visible within the respective keyframe further comprises: determining the face $F_t$ is visible when a dot product of a face normal and a camera direction is less than 0.

8. The method of claim 1, wherein computing texture coordinates for the vertices further comprises: representing a camera to world transform as Tk and representing intrinsics of the camera of the keyframe k assigned to the mesh segment as Ek; computing a texture coordinate for a vertex vt by projecting Vt to an image space using:

$$TCt = Ek * \text{inverse}(Tk) * vt.$$

9. A non-transitory computer readable medium (CRM) comprising instructions that, when executed by an apparatus, cause the apparatus to:
receive, at a computing device, a sequence of frames of a scene captured by a capturing device, and adding keyframes that partially overlap in the sequence of frames to a queue of keyframes;
access, by the computing device, a 3D mesh created from the sequence of frames;
determine, by the computing device, for each face in the 3D mesh, from which of the keyframes in the queue of keyframes the face is visible by projecting the face vertices into RGB images of the keyframes to test visibility, and adding the keyframes from which the face is visible to a visible keyframe list for each of the faces;
assign to each of the faces in the 3D mesh, by the computing device, a most recently added keyframe from the visible keyframe list, and dividing the 3D mesh into mesh segments based on the assigned keyframes;
use, by the computing device, the keyframe assigned to each of the mesh segments to compute texture coordinates (x, y) for vertices in the respective mesh segment, and assigning an image in the keyframe as a texture for the respective mesh segment; and
average, by the computing device, for each of the vertices in the 3D mesh, colors from the visible keyframe list associated with each of the vertices into a single RGB value, and assigning the RGB value to the vertex.

10. The CRM of claim 9, wherein adding keyframes that partially overlap in the sequence of frames to a queue of keyframes further comprises: determining, by the computing device, whether each of a pair of neighboring keyframes shares at least a predetermined number of points in a sparse depth map.

11. The CRM of claim 9, wherein determining when changes to a property of the 3D mesh meet a predetermined threshold further comprises: including as the property of the 3D mesh one or more of a number of faces, triangles, vertices, or an area of the 3D mesh.

12. The CRM of claim 11, further comprising:
representing the 3D mesh at time t using data structure $M_t$, $M_t$ comprising a set of vertices and a set of faces or triangles $F_t$;
responsive to receiving an update notification, determining a difference between a number of vertices in $M_t$ and $M_{(t-1)}$; and
if the difference is less than the predetermined threshold, ignoring the change to the 3D mesh until a next update notification.

13. The CRM of claim 9, wherein assigning to each face in the 3D mesh one of the keyframes from the queue of keyframes, and dividing the 3D mesh into mesh segments based on the assigned keyframes further comprises: assigning each of the mesh segments to a respective process or thread for averaging the coloring or for texturing.

14. The CRM of claim 9, wherein assigning to each face in the 3D mesh one of the keyframes from the queue of keyframes, and dividing the 3D mesh into mesh segments based on the assigned keyframes further comprises:
representing the 3D mesh at time t using data structure $M_t$, $M_t$ comprising a set of vertices and a set of faces $F_t$;
for each of the faces $F_t$, searching and testing the keyframes in the queue of keyframes from most recent to oldest to determine if a centroid $C_t$ of $F_t$ is visible within the respective keyframe; and
stopping the search when a keyframe k is found where $C_t$ is visible, and assigning the keyframe k to the face $F_t$.

15. The CRM of claim 14, wherein determining if the centroid $C_t$ of $F_t$ is visible within the respective keyframe further comprises: determining the face $F_t$ is visible when a dot product of a face normal and a camera direction is less than 0.

16. The CRM of claim 9, wherein computing texture coordinates for the vertices further comprises: representing a camera to world transform as Tk and representing intrinsics of the camera of the keyframe k assigned to the mesh segment as Ek; computing a texture coordinate for a vertex vt by projecting Vt to an image space using:

$$TCt = Ek * \text{inverse}(Tk) * vt.$$

* * * * *